(12) United States Patent
Keum et al.

(10) Patent No.: US 11,222,488 B2
(45) Date of Patent: Jan. 11, 2022

(54) ELECTRONIC MODULE AND CONTROL METHOD THEREOF

(71) Applicants: HYUNDAI MOTOR COMPANY, Seoul (KR); KIA MOTORS CORPORATION, Seoul (KR); Hyundai Autoever Corp., Seoul (KR)

(72) Inventors: Byung-Jik Keum, Seoul (KR); Bong Ju Kim, Yongin-si (KR); Jong-Yoon Yee, Seoul (KR); Hochoul Jung, Seongnam-si (KR)

(73) Assignees: Hyundai Motor Company, Seoul (KR); Kia Motors Corporation, Seoul (KR); Hyundai Autoever Corp., Seoul (KR)

(*) Notice: Subject to any disclaimer, the term of this patent is extended or adjusted under 35 U.S.C. 154(b) by 163 days.

(21) Appl. No.: 16/550,998

(22) Filed: Aug. 26, 2019

(65) Prior Publication Data
US 2020/0211304 A1    Jul. 2, 2020

(30) Foreign Application Priority Data
Dec. 27, 2018    (KR) .................. 10-2018-0171214

(51) Int. Cl.
| | | |
|---|---|---|
| G07C 5/08 | (2006.01) | |
| G07C 5/00 | (2006.01) | |
| G05D 1/00 | (2006.01) | |
| B60W 50/02 | (2012.01) | |

(52) U.S. Cl.
CPC ....... *G07C 5/0841* (2013.01); *B60W 50/0205* (2013.01); *G05D 1/0088* (2013.01); *G07C 5/008* (2013.01); *B60W 2050/021* (2013.01); *G05D 2201/0213* (2013.01)

(58) Field of Classification Search
CPC .... G07C 5/0841; G07C 5/008; G05D 1/0088; G05D 2201/0213; B60W 50/0205; B60W 2050/021; B60W 2030/082
See application file for complete search history.

(56) References Cited

U.S. PATENT DOCUMENTS

| | | | |
|---|---|---|---|
| 6,629,030 B2 * | 9/2003 | Klausner ................ | G07C 5/085 340/438 |
| 7,386,376 B2 * | 6/2008 | Basir .................... | G07C 5/0891 701/33.4 |
| 8,160,771 B2 * | 4/2012 | Okada .................... | G01P 1/127 701/32.2 |
| 8,219,279 B2 * | 7/2012 | Merrick ............ | B60W 50/0225 701/33.4 |

(Continued)

*Primary Examiner* — Michael J Zanelli
(74) *Attorney, Agent, or Firm* — Slater Matsil, LLP

(57) ABSTRACT

The present disclosure provides an electronic module including: a first memory; a second memory; a communication unit configured to communicate with a plurality of electronic modules and a server; and a controller configured to store, in the first memory, vehicle information obtained from at least one sensor provided in a vehicle, store, in the second memory, the vehicle information stored in the first memory, determine an electronic module of the plurality of electronic modules based on a location that the at least one situation occurred, and transmit, to the electronic module, at least a part of the vehicle information when the at least one predetermined situation occurs.

20 Claims, 8 Drawing Sheets

(56) References Cited

U.S. PATENT DOCUMENTS

| | | | |
|---|---|---|---|
| 8,436,722 B2* | 5/2013 | Roh | B60R 21/0134 |
| | | | 340/436 |
| 2007/0132773 A1* | 6/2007 | Plante | G07C 5/0891 |
| | | | 345/564 |
| 2019/0287319 A1* | 9/2019 | Golov | G06F 11/0796 |
| 2019/0302766 A1* | 10/2019 | Mondello | G06N 3/02 |
| 2019/0318555 A1* | 10/2019 | Hansel | G11C 5/141 |
| 2019/0385383 A1* | 12/2019 | Sato | G07C 5/0866 |

* cited by examiner

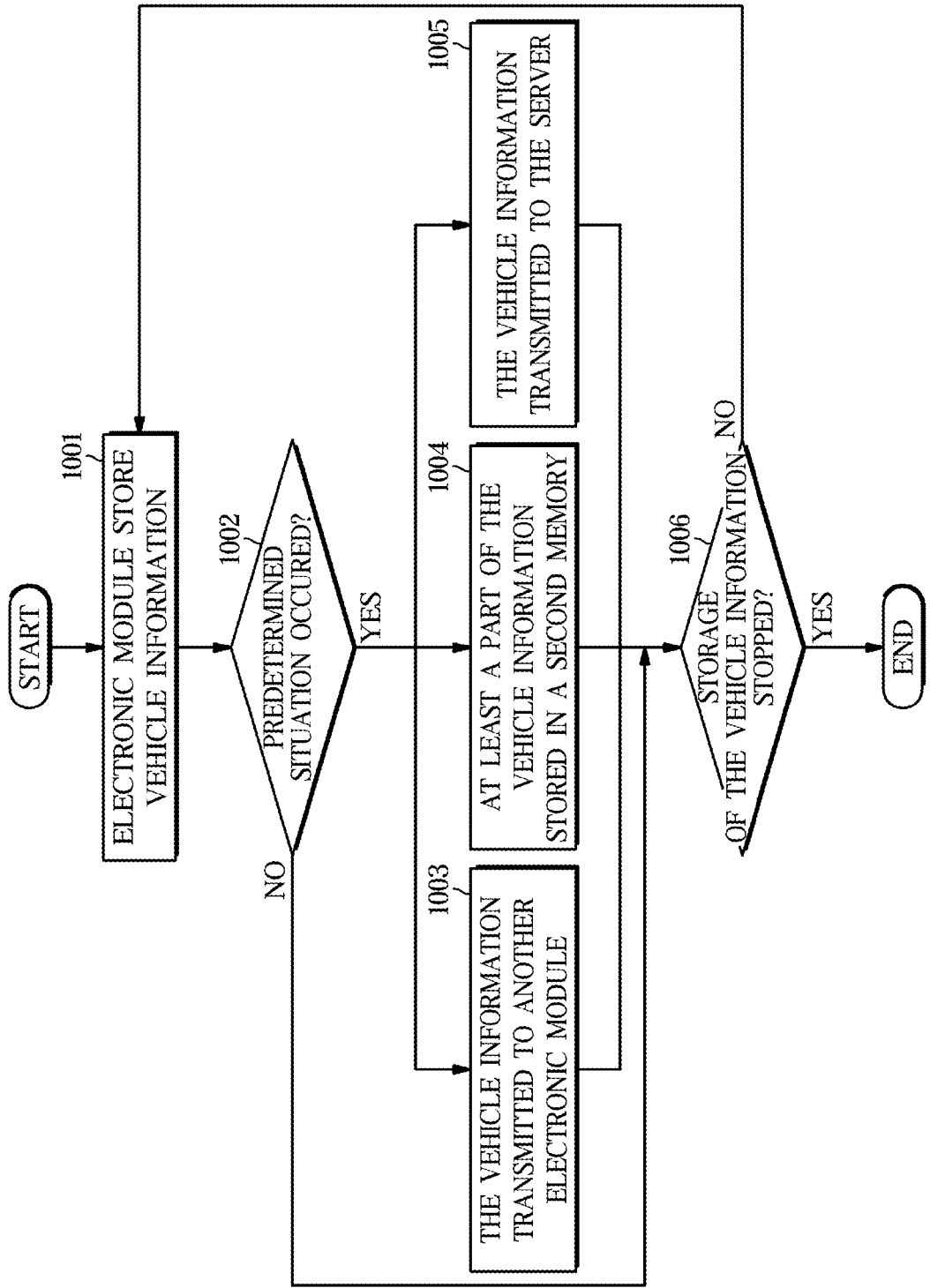

ELECTRONIC MODULE AND CONTROL METHOD THEREOF

CROSS-REFERENCE TO RELATED APPLICATION(S)

The present application claims priority to and the benefit of Korean Patent Application No. 10-2018-0171214, filed on Dec. 27, 2018, which is incorporated herein by reference in its entirety.

TECHNICAL FIELD

The present disclosure relates to an electronic module and a control method for stably and efficiently managing vehicle information in an autonomous driving situation.

BACKGROUND

The statements in this section merely provide background information related to the present disclosure and may not constitute prior art.

Autonomous driving technology of a vehicle is a technique in which the vehicle automatically recognizes a state of a road and drives the vehicle without controlling brakes, a handle, and an accelerator pedal.

The autonomous driving technology is a core technology for implementing a smart car. In order to implement an autonomous vehicle, the autonomous driving technology includes Highway Driving Assist (HDA, technology of automatically observing the proper distance between cars), Blind Spot Detection (BSD, technology of recognizing another vehicle during reversing or in a blind spot to sound a warning), Autonomous Emergency Brake (AEB, technology of operating the brakes when a driver fails to recognize another vehicle ahead), Lane Departure Warning System (LDWS), Lane Keeping Assist System (LKAS, technology of preventing departure from a lane without a turn signal), Advanced Smart Cruise Control (ASCC, technology of traveling at a constant speed while observing a predetermined distance between cars), and Traffic Jam Assist (TJA). A control module used in autonomous running of the vehicle can acquire vehicle information from a sensor provided in the vehicle and can control the vehicle based on the acquired information to perform the autonomous running.

On the other hand, the vehicle information used for autonomous driving of the vehicle can be stored in various forms.

Electronic modules performing the autonomous driving can be damaged if damaged. In this case, studies are being conducted to prevent the loss of the vehicle information.

SUMMARY

The present disclosure provides an electronic module and its control method capable of efficiently and safely managing vehicle information in a specific time domain even in the event of an accident or the like of an autonomous vehicle.

In accordance with one aspect of the present disclosure, an electronic module includes: a first memory; a second memory; a communication unit configured to communicate with another electronic module and a server; and a controller configured to store vehicle information, which is normally obtained from at least one sensor provided in a vehicle, in the first memory, store the vehicle information stored in the first memory in the second memory, determine the other electronic module that is storable based on a location at which a predetermined at least one situation occurred, and transmit at least a part of the vehicle information to the other electronic module when the at least one predetermined situation occurs.

The controller may be configured to store at least one of first vehicle information from a first start time before the occurrence of the predetermined situation to a first end point after the occurrence of the predetermined situation and second vehicle information from a second starting point before the occurrence of the predetermined situation to a second end point after the occurrence of the predetermined situation to the second memory.

The controller may be configured to transmit the second vehicle information to the other electronic module prior to the first vehicle information when the at least one predetermined situation occurs.

The predetermined at least one situation may comprise at least one of an autonomous driving situation, an accident occurrence situation and a system fault occurrence situation.

The controller may be configured to transmit at least a part of the vehicle information to the other electronic module through a gateway module provided in the vehicle.

The controller may be configured to transmit at least a part of the vehicle information to the other electronic module based on data acquired by the other electronic module through a gateway module.

In accordance with one aspect of the present disclosure, a control method of an electronic module comprising: storing vehicle information, which is normally obtained from at least one sensor provided in a vehicle, in a first memory; storing the vehicle information stored in the first memory in a second memory when at least one predetermined situation occurs; determining the other electronic module that is storable based on a location at which the predetermined at least one situation occurred; and transmitting at least a part of the vehicle information to the other electronic module The storing of the vehicle information stored in the first memory in the second memory may include storing at least one of first vehicle information from a first start time before the occurrence of the predetermined situation to a first end point after the occurrence of the predetermined situation and second vehicle information from a second starting point before the occurrence of the predetermined situation to a second end point after the occurrence of the predetermined situation to the second memory.

The transmitting of at least a part of the vehicle information to the other electronic module may include transmitting the second vehicle information to the other electronic module prior to the first vehicle information when the at least one predetermined situation occurs.

The predetermined at least one situation may comprise at least one of an autonomous driving situation, an accident occurrence situation and a system fault occurrence situation.

Further areas of applicability will become apparent form the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4A:
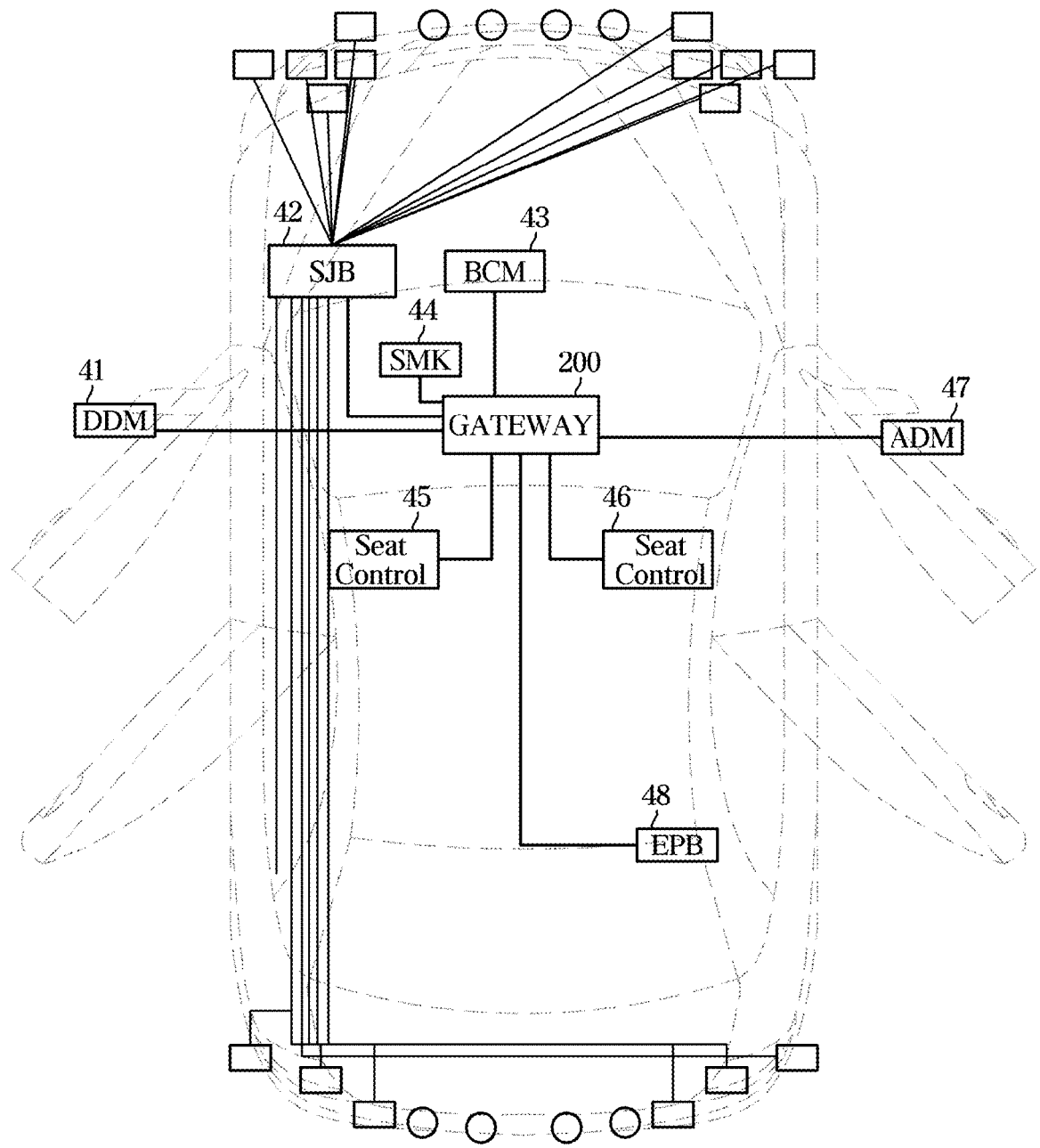
FIG. 4A is a diagram for explaining an operation of a controller controlling a gateway module in one form of the present disclosure.
Figure 4B:
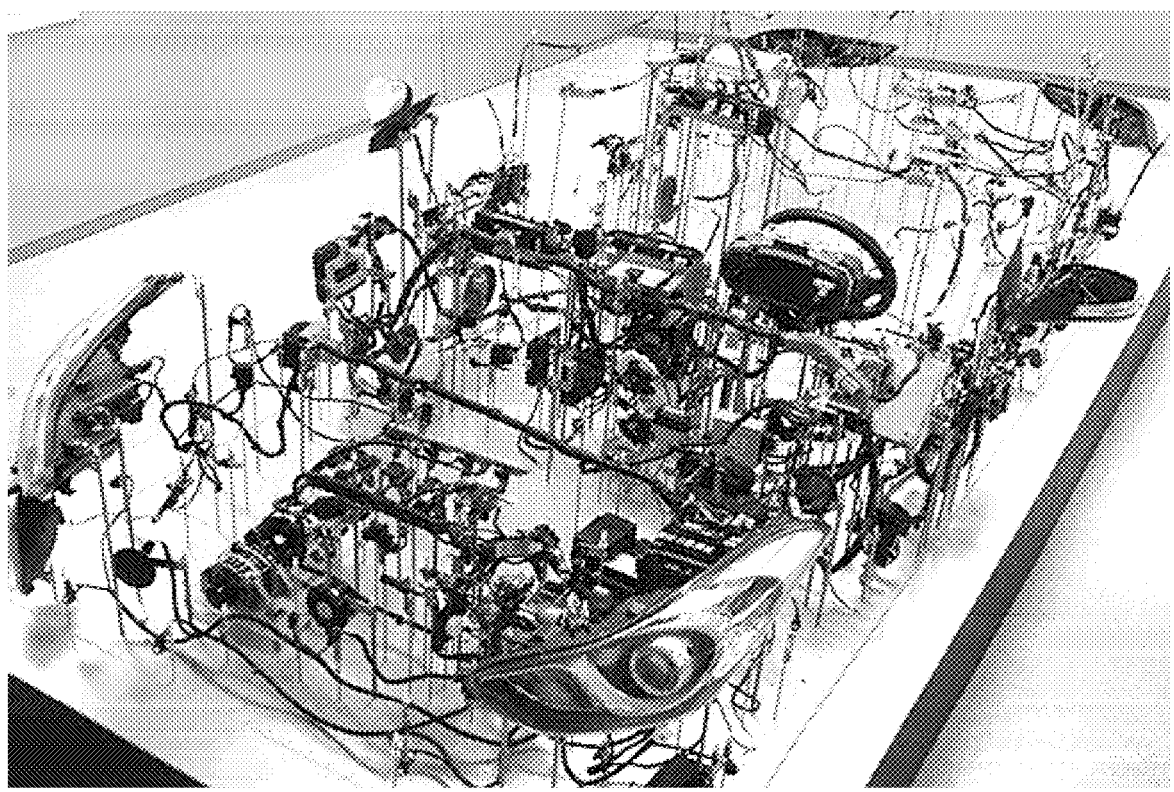
Figure 4C:
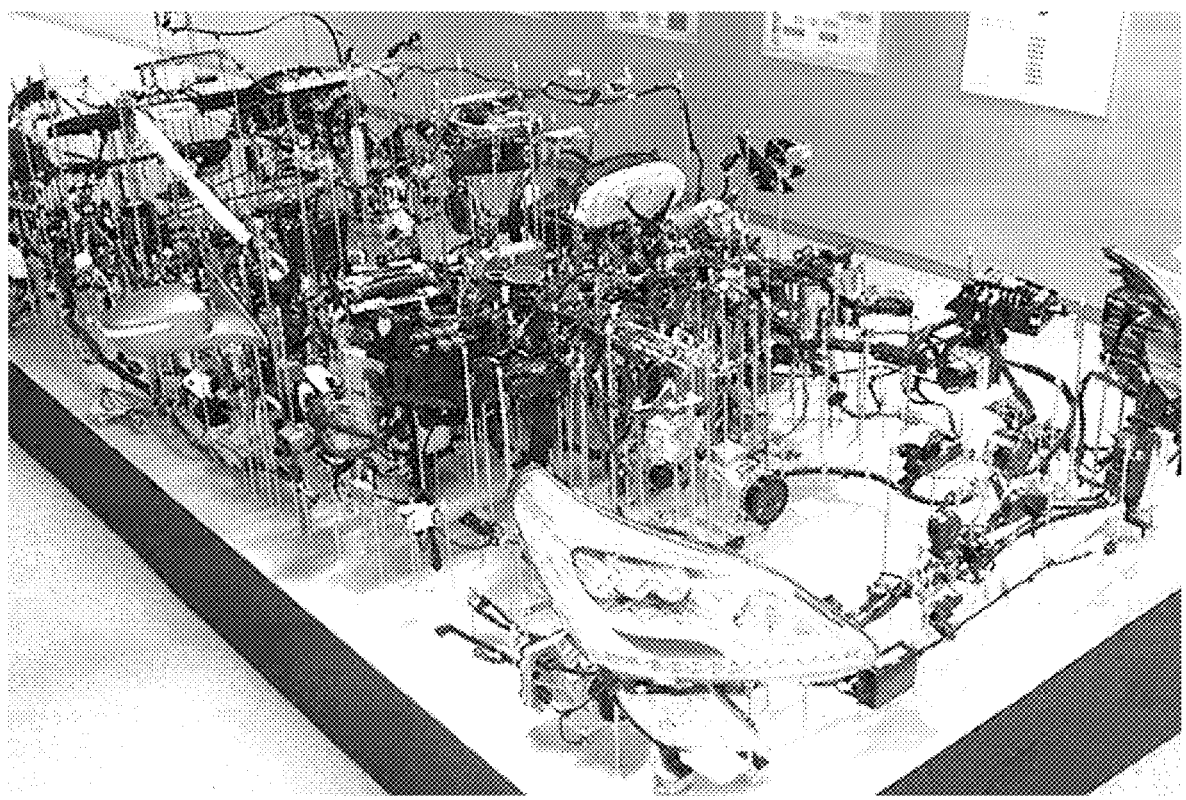
Figure 4D:
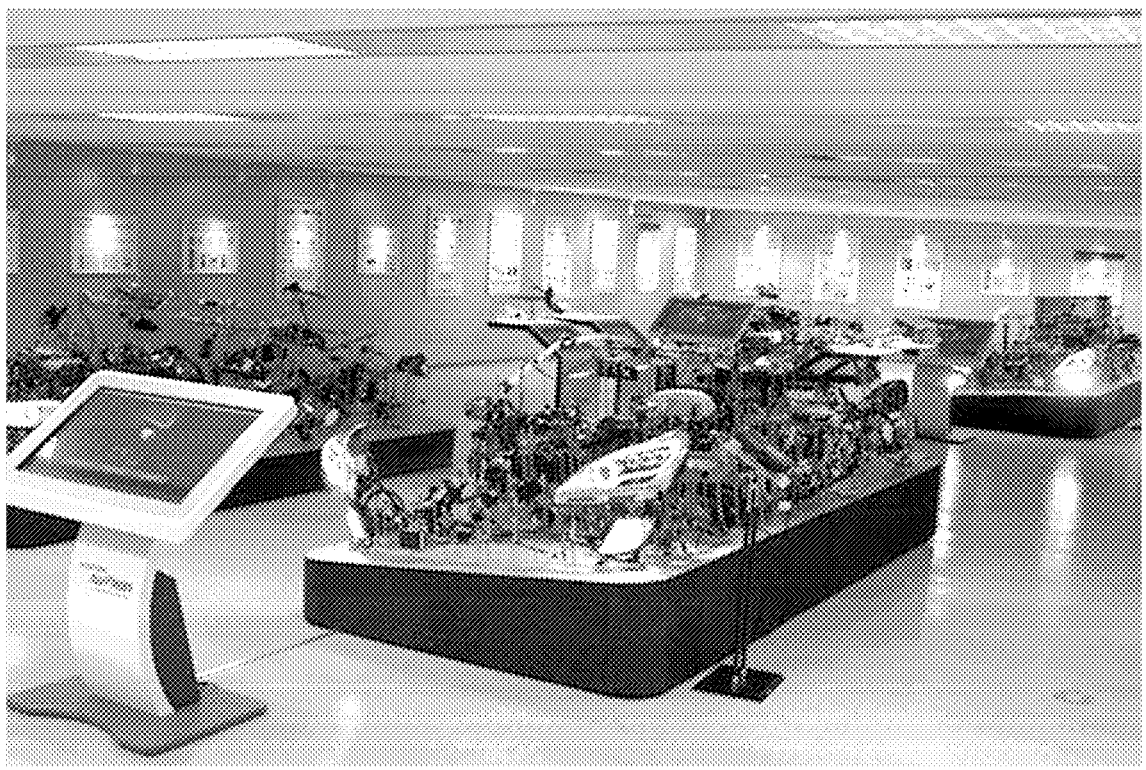

FIGS. 4B, 4C, and 4D are views of an actual implementation of FIG. 4A.

FIG. 5 is a flow diagram in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like numbers refer to like elements throughout this specification and in the drawings. This specification does not describe all components of the embodiments, and general information in the technical field to which the present disclosure belongs or overlapping information between the embodiments is also not described. The terms "part," "module," "element," and "block," as used herein, may be implemented as software or hardware, and in the disclosed embodiments, a plurality of "parts," "modules," "elements," and "blocks" may be implemented as a single component, or a single "part," "module," "element," and "block" may include a plurality of components.

It will be understood that when a component is referred to as being "connected" to another component, it can be directly or indirectly connected to the other component. When a component is indirectly connected to another component, it may be connected to the other component through a wireless communication network.

Also, it will be understood that the terms "includes," "comprises," "including," and/or "comprising," when used in this specification, specify the presence of a stated component, but do not preclude the presence or addition of one or more other components.

It will be understood that, although the terms first, second, third, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations. Also, the operations can be executed in a different order from the stated order unless a specific order is definitely specified in the context.

Hereinafter, the operation principle and some forms of the present disclosure are described with reference to the accompanying drawings.

Figure 1:
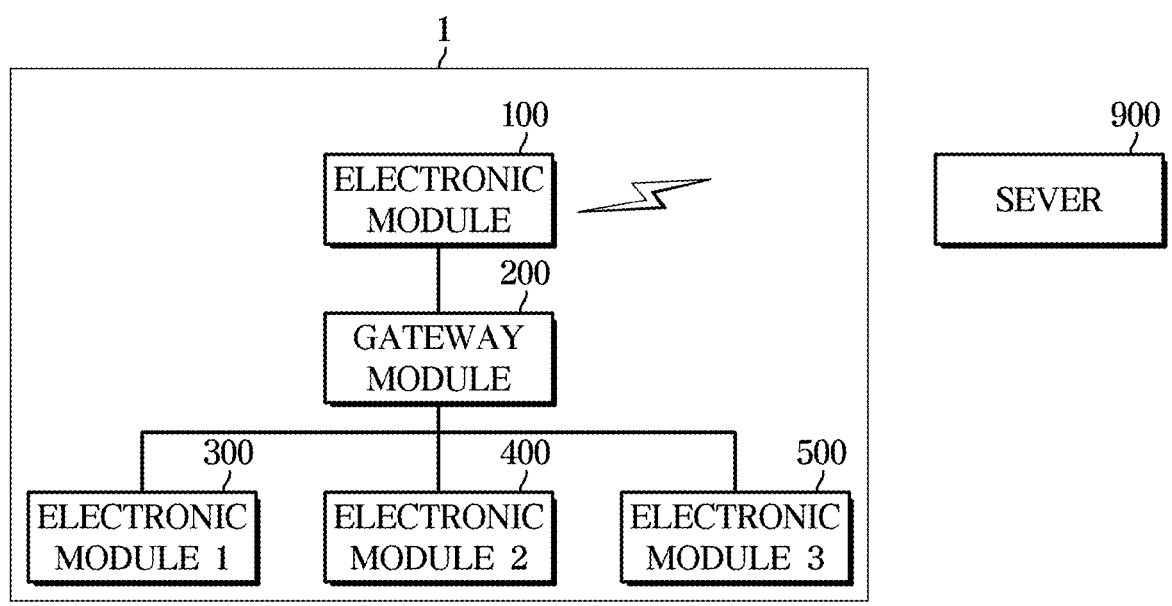
FIG. 1 is a diagram for explaining a relationship between an electronic module, another electronic module, and a server in one form of the present disclosure.

FIG. 1 is a diagram for explaining a relationship between an electronic module, another electronic module, and a server in some forms of the present disclosure.

An electronic module 100 is a controller responsible for an autonomous running function of a vehicle 1.

The electronic module 100 can receive signals from various sensors provided in the vehicle 1 to determine an optimal travel route and control acceleration/deceleration, braking, steering, etc. of the vehicle.

The sensor in some forms of the present disclosure may be implemented as a three-axis sensor with an acceleration sensor.

The acceleration sensor can be implemented to obtain acceleration information in the x-, y-, and z-axis directions when the vehicle moves in three dimensions.

The acceleration sensor may be implemented as a gyro sensor. If the sensor is configured to calculate impact information of the vehicle, the type of the sensor is not limited.

The sensors provided in the vehicle 1 may also include a camera, a radar, and a lidar.

A gateway module 200 is a device for connecting all or some electronic modules 300, 400, and 500 of the vehicle to communicate with each other.

On the other hand, the vehicle 1 may have other types of the electronic modules 300, 400, and 500 in addition to the electronic module that performs the above-described autonomous traveling function.

Also, the gateway module 200 provided in the vehicle can form a network between the electronic modules, and can be provided with a configuration capable of exchanging signals between the electronic modules.

A server 900 can record data that exists outside the vehicle and is transmitted from the vehicle.

The server 900 may be a processor for monitoring or controlling the entire network, for connecting to another network through a mainframe or a public network, and for sharing hardware resources such as software resources or other equipment.

Meanwhile, the electronic module provided in the vehicle 1 can perform communication with the server using various methods.

The electronic module provided in the vehicle may be a radio frequency (RF) module, a wireless fidelity module, a Wi-Fi module, a Bluetooth module, a Zigbee module, a near field communication (NFC) module and an ultra-wide band (UWB) module for communicating with an external server.

The electronic module is not limited to the above-described methods for performing communication with the server, and any method may be used as long as it is capable of communicating with the server.

Meanwhile, the electronic module 100 can be connected to the gateway module through a high-speed communication network such as Ethernet, Flexray, or CAN-FD.

The gateway module may be connected to a plurality of the other electronic modules provided in the vehicle through a high-speed communication network.

The configuration and operation described in FIG. 1 are only examples for explaining the relationship with the server and the electronic module or the like provided in the vehicle.

The operation is not limited as long as the electronic module, the server, and the other electronic modules perform the communication.

Figure 2:
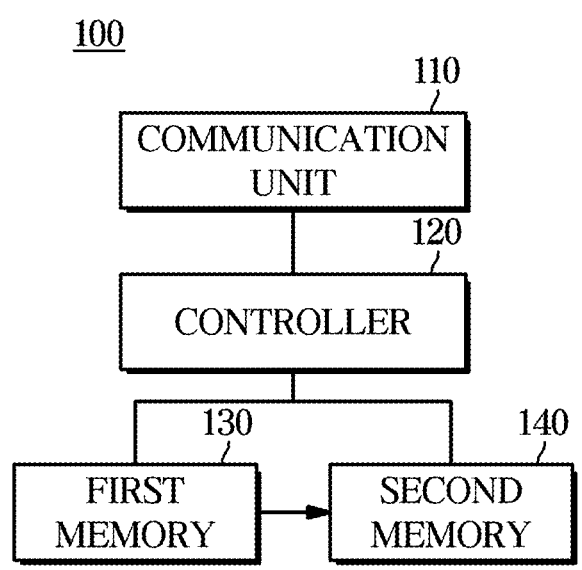
FIG. 2 is a control block diagram for explaining a configuration of an electronic module in one form of the present disclosure.

FIG. 2 is a control block diagram for explaining a configuration of an electronic module in some forms of the present disclosure.

The electronic module in some forms of the present disclosure may include a communication unit 110, a controller 120, a first memory 130, and a second memory 140.

The first memory 130 may be constituted by a memory for storing information of the vehicle acquired from the sensors provided in the vehicle.

On the other hand, the vehicle information acquired by the vehicle may include various data for determining the situation required for the self-running of the electronic module such as a sensor signal, a vehicle speed, position, steering information, and the like.

The first memory 130 may be a volatile memory.

The volatile memory can refer to a memory that requires electricity to maintain stored information.

In some forms of the present disclosure, the first memory 130 may include dynamic random access memory (DRAM) and static random access memory (SRAM).

The second memory 140 may be configured to receive and store the memory stored in the first memory 130 when a predetermined condition occurs, as will be described later.

The predetermined situation may include an autonomous running situation, an accident occurrence situation, and a system failure occurrence situation as will be described later.

The second memory 140 may be a non-volatile memory.

The non-volatile memory may be a storage medium that retains information even when the power is off, and can use the stored information again when the power is supplied.

The second memory 140 may be a non-volatile memory device such as ROM (Read Only Memory), PROM (Programmable ROM), EPROM (Erasable Programmable ROM), and EEPROM (Electrically Erasable Programmable ROM).

The communication unit 110 can communicate with the other electronic modules and servers.

Specifically, the communication unit 110 provided in the electronic module can directly communicate with the other electronic modules or communicate with the other electronic modules through the gateway module.

The communication unit 110 can also communicate with the server.

The communication unit 110 may include one or more components that enable communication to communicate with the server and the other electronic modules.

For example, the communication unit 110 may include at least one of a short-range communication module, a wired communication module, and a wireless communication module.

The short-range communication module uses a wireless communication network, such as a Bluetooth module, an infrared communication module, an RFID (Radio Frequency Identification) communication module, a WLAN (Wireless Local Access Network) communication module, an NFC communication module, and a Zigbee communication module, and may include various short range communication modules for transmitting and receiving.

The wired communication module may be a wired communication module such as a Controller Area Network (CAN) communication module, a Local Area Network (LAN) module, a Wide Area Network (WAN) module, and a Value Added Network module or various cable communication modules such as Universal Serial Bus (USB), High Definition Multimedia Interface (HDMI), Digital Visual Interface (DVI), Recommended Standard 232 (RS-232), power line communication; and plain old telephone service (POTS).

In addition to a Wi-Fi module and a wireless broadband module, the wireless communication module may be Global System for Mobile Communication (GSM), Code Division Multiple Access (CDMA), Wideband Code Division Multiple Access (WCDMA), Time Division Multiple Access (TDMA), Long Term Evolution (LTE), and the like.

The controller 120 may store the vehicle information that is normally obtained from at least one sensor provided in the vehicle in the first memory 130, and when at least one of the predetermined situations occurs, store the vehicle information in the second memory 140.

The controller 120 in some forms of the present disclosure may perform a data logger function to record a state of an accident.

The data logger may refer to a data accumulation system.

The data logger can be used to store data obtained by the various sensors during driving, stored in a memory integrated circuit of a computer, and to output the data at the time of stop, or in combination with a telemetry system to read the data while driving.

The data logger can always store the incoming vehicle information acquired by the electronic module in the first memory 130 by the software operating in the controller 120.

Here, the vehicle information may include various data for determining the situation of an autonomous driving controller such as the sensor signal, the vehicle speed, the position, the steering information, and vehicle exterior/interior camera image information.

The controller 120 may store the vehicle information from a predetermined time before the occurrence of the situation to the time after the occurrence of the predetermined situation in the second memory 140.

In some forms of the present disclosure, the controller 120 may store previous 30-second data and subsequent 30-second data in the second memory 140 based on a time point at which the predetermined situation occurs.

The controller 120 may store the vehicle information in the first memory 130 at all times.

The controller may store the vehicle information stored in the first memory 130 in the second memory 140 when the predetermined situation occurs.

The controller 120 may transmit at least a part of the vehicle information to at least one of the other electronic modules and the server when the predetermined at least one situation occurs.

Specifically, the electronic module can transmit the vehicle information to another electronic module through the gateway module when at least one of the predetermined conditions described above occurs.

The electronic module can transmit the vehicle information to the server through the communication unit 110 provided in the electronic module.

The controller 120 may control the gateway module to transmit at least a part of the vehicle information to the other electronic module based on a location where the predetermined at least one situation occurred and the location of the other electronic module.

The controller may control the gateway module to transmit at least a part of the vehicle information to the other electronic module based on data acquired by the other electronic module.

Details related to this will be described later.

At least one of the components may be added or deleted corresponding to the performance of the components of the electronic module shown in FIG. 2

It will be readily understood by those skilled in the art that the mutual position of the components can be changed corresponding to the performance or structure of the system.

Each of the components shown in FIG. 2 refers to hardware components such as software and/or a Field Programmable Gate Array (FPGA) and an Application Specific Integrated Circuit (ASIC).

Figure 3:
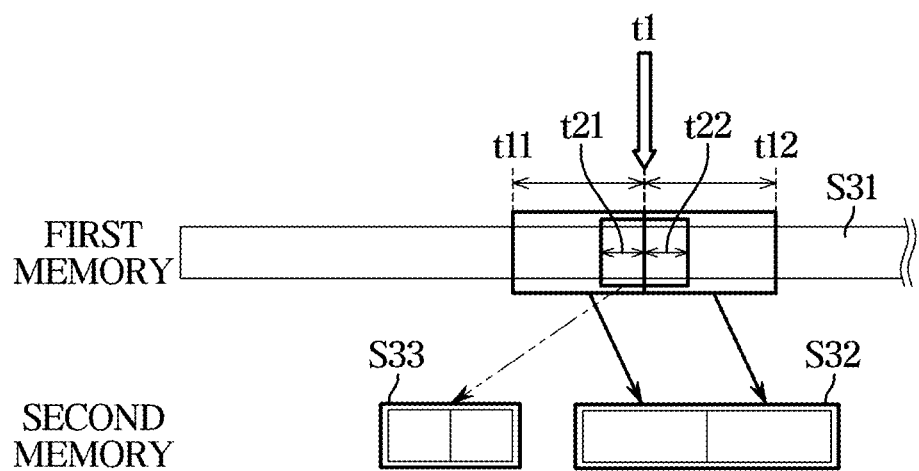
FIG. 3 is a view for explaining an operation of storing a part of vehicle information in one form of the present disclosure.

FIG. 3 is a view for explaining an operation of storing a part of vehicle information in some forms of the present disclosure.

Referring to FIG. 3, the normal vehicle information stored in the first memory is stored in the second memory.

The controller basically performs the vehicle information recording function at all times.

Since vehicle information S31 stored in the first memory is stored in a volatile memory, data cannot be checked when a situation such as an accident occurs.

The controller may store at least a part of vehicle information S32 and S33 stored in the first memory and the second memory in advance if it is determined that a predetermined situation such as an accident situation has occurred.

The controller sets the first vehicle information S32 from a first start time t11 before the occurrence of the predetermined situation to a first ending time t12 after the predetermined occurrence of the situation on the basis of the predetermined time t1, It can be stored in memory.

The controller may store the second vehicle information S33 from a second start time t21 before the occurrence of the predetermined situation to a second end time t22 after the occurrence of the predetermined situation on the basis of the predetermined time t1 to the second memory.

On the other hand, the time from the second start time to the second end time may be shorter than the time from the first start time to the first end time.

Also, the second vehicle information may be stored in a storage form in which frame and resolution are low per unit time as compared with the first vehicle information.

In some forms of the present disclosure, the controller may store the 30-second data and the 30-second vehicle information before the predetermined situation occurs in the second memory.

Meanwhile, at the same time, the controller can transmit the vehicle information to the gateway module and transmit it to the server through the communication unit.

In addition, the predetermined conditions described above may include a highway driving pilot (HDP) success situation, an accident risk situation, and a system abnormal situation.

An autonomous driving success situation may include a situation in which a first autonomous driving function is activated.

The accident risk situation may include the occurrence of an airbag deployment signal, the occurrence of a frontal collision warning more than 3 times, a braking situation, and a warning point occurrence due to an internal logic operation.

Incident scenarios may also include side crash hazards.

Side crash risk situations can include side crashes and braking, and internal logic triggered alert events.

It may also include situations where an autonomous navigation system guides a driver to transfer control.

Incident situations can also include situations where MRM (Minimum Risk Maneuver) and EM (Emergency Maneuver) are performed.

The MRM (Minimum Risk Maneuver) is a risk minimization strategy that can include stopping by the car, moving a shoulder vehicle, and emergency flashing within 4 seconds after operation of the MRM.

EM (Emergency Maneuver) can mean emergency control if it detects a sudden collision with other road users and the driver lacks the time to switch control.

The predetermined situation may also include a system failure occurrence situation.

The occurrence of the system may include release of an autonomous driving system under unintentional conditions without the driver's intervention or cancellation, an acceleration or deceleration occurrence situation exceeding a predetermined or higher range by autonomous driving, and excessive steering operation due to the autonomous driving.

On the other hand, the operation and the predetermined situation described in FIG. 3 are only one form for explaining the operation of the present disclosure, and there is no limitation in the operation of storing the information of the vehicle or delivering it to another electronic module or server in a specific situation.

FIG. 4A is a diagram for explaining an operation of a controller controlling a gateway module in some forms of the present disclosure.

FIGS. 4B, 4C, and 4D are views of an actual implementation of FIG. 4A.

FIG. 4A shows another electronic module provided in the vehicle.

In some forms of the present disclosure, the vehicle includes a SJB (Smart Junction box) 42, a SKM (Smart Key Module)) 44, a BCM (Body Control Module) 43, a DDM (Driver Door Module) 41, an ADM (Assist Door Module) 47, an EPB (Electric Parking Brake) 48, and seat control modules (Seat control) 45 and 46.

Meanwhile, the vehicle may include the gateway module 200.

The gateway module 200 can transmit the vehicle information to the other electronic modules 41 to 48 in various ways as follows.

In some forms of the present disclosure, the electronic module can control the gateway module 200 to receive the vehicle information and transmit it to the electronic modules 41 to 48 connected to the gateway module 200.

The gateway module 200 can simply transmit the vehicle information as a whole regardless of which of the electronic module 41 to 48 has a data recording function.

When each of the electronic modules has the recording function, the gateway module 200 can receive the corresponding vehicle information and store it in the nonvolatile memory of each of the electronic modules and display a diagnostic code.

In some forms of the present disclosure, the gateway module 200 receiving the vehicle information from the electronic module can transmit the corresponding vehicle information to another electronic module.

The electronic module may control the gateway module 200 to transmit at least a part of the vehicle information to the other electronic modules based on the location where the predetermined at least one situation occurred and the location of the other electronic modules 41 to 48.

In some forms of the present disclosure, when an accident occurs, the ADM (Assist Door Module) 47, the electronic module judges the position of the ADM (Assist Door Module) 47, and the ADM located farthest from the ADM is an electronic module It can be judged.

That is, when the predetermined condition such as an accident occurs on the left side of the vehicle, the electronic module judges that the damage of the electronic module located on the right side opposite to the left side is small, so that the electronic module located on the right side can judge that the vehicle information can be stored.

In some forms of the present disclosure, the electronic module for storing the vehicle information is divided into east, south, north, and west, respectively, of the vehicle, and the vehicle information can be stored in each of the electronic modules based on a collision position.

Referring to FIGS. 3 and 4A together, when the electronic module transmits the vehicle information to another electronic module, the second vehicle information having a relatively small capacity can be transmitted first, and then the first vehicle information can be transmitted.

The electronic module can transmit the vehicle information to the DDM (Driver Door Module) 41 located opposite the ADM (Assist Door Module) 41 position to reduce the damage of the vehicle information.

The electronic module may control the gateway module 200 to transmit at least a part of the vehicle information to the other electronic modules 41 to 48 based on data acquired by the other electronic module.

The gateway module 200 can transmit only the data that the receiving electronic module does not receive without sending the vehicle information when sending the vehicle information to each of the electronic modules.

In some forms of the present disclosure, the SJB (Smart Junction box) 42 and the electronic module that performs the autonomous driving can receive a surround view image. At this time, the electronic module sends the vehicle information to the gateway module 200, and the gateway module 200 can transmit the remaining vehicle information except for the surround view image when transmitting data to the SJB (Smart Junction box) 42.

The SJB (Smart Junction box) 42 may store the received data directly from the gateway module 200 together with the surround view image.

The electronic module performing the autonomous driving through the above-mentioned operation can reduce a data transmission time and a network load by transmitting the remaining vehicle information except for the surround view image.

FIG. 5 is a flow diagram in some forms of the present disclosure.

Referring to FIG. 5, the electronic module may receive the vehicle information and store it in the first memory as described above (1001).

The vehicle may perform normal data recording if the predetermined situation does not occur (1002).

In addition, the electronic module can receive the vehicle information again (1006) if the operation of saving the vehicle information is not completed.

When the predetermined situation occurs, the vehicle information can be transmitted to another electronic module (1003), at least a part of the vehicle information can be stored in the second memory (1004) provided in the electronic module, and the vehicle information can be transmitted to the server (1005).

Meanwhile, when the operation of storing a part of the vehicle information of the electronic module in the second memory is completed, the vehicle information can be always stored in the first memory.

When the operation of storing the vehicle information is completed, the storage of the vehicle information can be stopped (1006).

Meanwhile, some forms of the present disclosure as described above may be embodied in the form of a recording medium to store commands that can be executed by a computer. The commands may be stored in the form of program codes, and can create a program module, when executed by a processor, to perform the operations of the above-described forms of the present disclosure. The recording medium may be embodied as a computer-readable recording medium.

The computer-readable recording medium may be or include any kind of recording device to store commands that can be interpreted by a computer. For example, the computer-readable recording medium may be ROM, RAM, a magnetic tape, a magnetic disk, flash memory, or an optical data storage device.

For the vehicle and the control method thereof in some forms of the present disclosure, by recognizing the driving situation of the vehicle upon autonomous driving, and controlling the components of the vehicle when a dangerous situation is sensed, safe autonomous driving is possible.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An electronic module comprising:
a first memory;
a second memory;
a communication unit configured to communicate with a plurality of other electronic modules and a server; and
a controller configured to store, in the first memory, vehicle information obtained from at least one sensor provided in a vehicle, wherein, when at least one predetermined situation occurs, the controller is further configured to:
store, in the second memory, the vehicle information stored in the first memory;
determine an electronic module of the plurality of other electronic modules based on a location on the vehicle that the at least one predetermined situation occurred; and
transmit, through the communication unit, at least a part of the vehicle information to a plurality of the other electronic modules.

2. The electronic module of claim 1, wherein the controller is configured to store, in the second memory, at least one of first vehicle information or second vehicle information, wherein the first vehicle information is determined from a first starting point before the at least one predetermined situation occurs to a first ending point after the at least one predetermined situation occurs, the second vehicle information is determined from a second starting point before the at least one predetermined situation occurs to a second ending point after the at least one predetermined situation occurs.

3. The electronic module of claim 2, wherein the controller is configured to transmit, through the communication unit, the second vehicle information prior to the first vehicle information to the plurality of other electronic modules when the at least one predetermined situation occurs.

4. The electronic module of claim 1, wherein the at least one predetermined situation comprises at least one of an autonomous driving, an accident occurrence or a system fault.

5. The electronic module of claim 4, wherein the at least one predetermined situation comprises the autonomous driving.

6. The electronic module of claim 4, wherein the at least one predetermined situation comprises the accident occurrence.

7. The electronic module of claim 4, wherein the at least one predetermined situation comprises the system fault.

8. The electronic module of claim 1, wherein the controller is configured to transmit, through the communication unit, the at least the part of the vehicle information to the plurality of other electronic modules through a gateway module provided in the vehicle.

9. The electronic module of claim 1, wherein the controller is configured to transmit, through the communication unit and a gateway module, the at least the part of the vehicle information to the plurality of other electronic modules based on data acquired by the plurality of other electronic modules.

10. A control method of an electronic module comprising:
storing, in a first memory, vehicle information obtained from at least one sensor provided in a vehicle;
storing, in a second memory, the vehicle information stored in the first memory when at least one predetermined situation occurs;
determining, by a controller, an electronic module of a plurality of other electronic modules based on a location on the vehicle that the at least one predetermined situation occurred; and
transmitting, by the controller and through a communication unit, at least a part of the vehicle information to the plurality of other electronic modules.

11. The control method of claim 10, wherein storing the vehicle information in the second memory comprises storing, in the second memory, at least one of first vehicle information or second vehicle information, wherein the first vehicle information is determined from a first starting point before the at least one predetermined situation occurs to a first ending point after the at least one predetermined situation occurs, and the second vehicle information is determined from a second starting point before the at least one predetermined situation occurs to a second ending point after the at least one predetermined situation occurs.

12. The control method of claim 11, wherein transmitting the at least the part of the vehicle information comprises transmitting, through the communication unit-, the second vehicle information prior to the first vehicle information to the plurality of other electronic modules when the at least one predetermined situation occurs.

13. The control method of claim 10, wherein the at least one predetermined situation comprises at least one of an autonomous driving, an accident occurrence, or a system fault.

14. A vehicle comprising:
a first memory;
a second memory;
a plurality of electronic modules;
a communication unit configured to communicate with the plurality of electronic modules and a server; and
a controller configured to store, in the first memory, vehicle information obtained from at least one sensor provided in the vehicle, wherein, when at least one predetermined situation occurs, the controller is further configured to:
store, in the second memory, the vehicle information stored in the first memory;
determine an electronic module of the plurality of electronic modules based on a location on the vehicle that the at least one predetermined situation occurred; and
transmit, through the communication unit, at least a part of the vehicle information to at least the determined electronic module.

15. The vehicle of claim 14, further comprising a gateway module, wherein the controller is configured to communicate with the plurality of electronic modules through the communication unit and the gateway module.

16. The vehicle of claim 14, wherein the plurality of electronic modules includes a smart junction box, a smart key module, a body control module, a driver door module, an assist door module, an electric parking brake and a seat control module.

17. The vehicle of claim 14, wherein the controller is configured to store, in the second memory, at least one of first vehicle information or second vehicle information, wherein the first vehicle information is determined from a first starting point before the at least one predetermined situation occurs to a first ending point after the at least one predetermined situation occurs, the second vehicle information is determined from a second starting point before the at least one predetermined situation occurs to a second ending point after the at least one predetermined situation occurs.

18. The vehicle of claim 17, wherein the controller is configured to transmit, through the communication unit, the second vehicle information prior to the first vehicle information to the plurality of electronic modules when the at least one predetermined situation occurs.

19. The vehicle of claim 14, wherein the at least one predetermined situation comprises at least one of an autonomous driving, an accident occurrence, or a system fault.

20. The vehicle of claim 14, wherein the controller is configured to transmit, through the communication unit, the at least the part of the vehicle information to the plurality of electronic modules through a gateway module provided in the vehicle.

* * * * *